(12) United States Patent
Kimura

(10) Patent No.: US 12,223,988 B1
(45) Date of Patent: Feb. 11, 2025

(54) MAGNETIC RECORDING/REPRODUCING DEVICE AND CONTROL METHOD OF MAGNETIC RECORDING/REPRODUCING DEVICE

(71) Applicants: Kabushiki Kaisha Toshiba, Tokyo (JP); Toshiba Electronic Devices & Storage Corporation, Tokyo (JP)

(72) Inventor: Kaori Kimura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/596,531

(22) Filed: Mar. 5, 2024

(30) Foreign Application Priority Data

Sep. 20, 2023 (JP) ................................ 2023-152174

(51) Int. Cl.
| | |
|---|---|
| G11B 5/596 | (2006.01) |
| G11B 5/00 | (2006.01) |
| G11B 5/60 | (2006.01) |
| G11B 5/725 | (2006.01) |

(52) U.S. Cl.
CPC .......... G11B 5/596 (2013.01); G11B 5/6011 (2013.01); G11B 5/725 (2013.01); *G11B 2005/0021* (2013.01)

(58) Field of Classification Search
CPC ....... G11B 5/596; G11B 5/6011; G11B 5/725; G11B 2005/0021
See application file for complete search history.

(56) References Cited

U.S. PATENT DOCUMENTS

| | | |
|---|---|---|
| 7,375,914 B1 | 5/2008 | Dieron et al. |
| 9,858,953 B1 | 1/2018 | Johnson |
| 9,875,764 B1* | 1/2018 | Riddering ............... G11B 5/41 |
| 9,922,676 B1 | 3/2018 | Schreck et al. |
| 10,410,660 B1 | 9/2019 | Hutchinson et al. |
| 10,468,071 B1 | 11/2019 | Tasaka et al. |
| 11,282,539 B2 | 3/2022 | Kudo |
| 2010/0074062 A1* | 3/2010 | Kamijima ............... G11B 5/314 |
| | | 369/13.14 |
| 2015/0235663 A1* | 8/2015 | Canchi ................. G11B 5/6088 |
| | | 369/13.11 |
| 2017/0221511 A1 | 8/2017 | Dai et al. |
| 2020/0090686 A1 | 3/2020 | Hutchinson et al. |
| 2020/0265865 A1 | 8/2020 | Hutchinson et al. |

(Continued)

FOREIGN PATENT DOCUMENTS

| | | |
|---|---|---|
| JP | 2020-187815 A | 11/2020 |
| JP | 2021-47951 A | 3/2021 |

(Continued)

OTHER PUBLICATIONS

Unpublished U.S. Appl. No. 18/119,730, filed Mar. 9, 2023.

*Primary Examiner* — Andrew Sasinowski
(74) *Attorney, Agent, or Firm* — Kim & Stewart LLP

(57) ABSTRACT

According to one embodiment, a magnetic recording/reproducing device includes a housing which accommodates a magnetic recording medium, and a magnetic head which records or reproduces magnetic data relative the magnetic recording medium, and a synthetic adsorbent provided in the housing and containing a polystyrene-divinylbenzene copolymer.

18 Claims, 8 Drawing Sheets

(56) References Cited

U.S. PATENT DOCUMENTS

| | | | |
|---|---|---|---|
| 2020/0365183 A1 | 11/2020 | Matsumoto | |
| 2021/0090605 A1 | 3/2021 | Suzuki et al. | |
| 2021/0201941 A1 | 7/2021 | Hyodo | |
| 2021/0256996 A1 | 8/2021 | Ohtake et al. | |
| 2021/0287701 A1 | 9/2021 | Kudo | |
| 2022/0051693 A1 | 2/2022 | Hyodo | |
| 2023/0063493 A1 | 3/2023 | Matsumoto et al. | |
| 2024/0096349 A1 | 3/2024 | Isokawa et al. | |
| 2024/0321305 A1* | 9/2024 | Ohtake | G11B 5/6011 |

FOREIGN PATENT DOCUMENTS

| | | |
|---|---|---|
| JP | 2021-106063 A | 7/2021 |
| JP | 2021-131918 A | 9/2021 |
| JP | 2022-32269 A | 2/2022 |
| JP | 2023-31619 A | 3/2023 |
| JP | 2024-44496 A | 4/2024 |

* cited by examiner

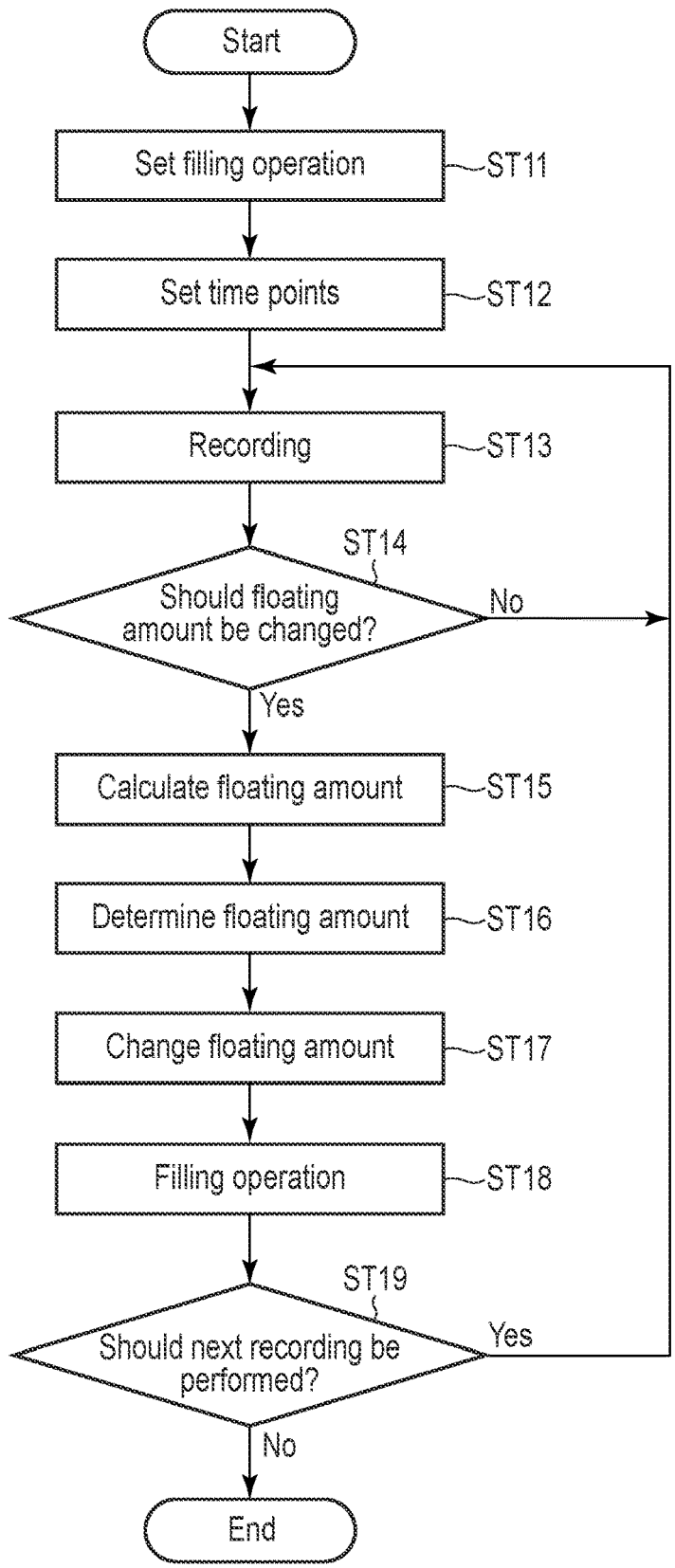
F I G. 10

MAGNETIC RECORDING/REPRODUCING DEVICE AND CONTROL METHOD OF MAGNETIC RECORDING/REPRODUCING DEVICE

CROSS-REFERENCE TO RELATED APPLICATIONS

This application is based upon and claims the benefit of priority from Japanese Patent Application No. 2023-152174, filed Sep. 20, 2023, the entire contents of which are incorporated herein by reference.

FIELD

Embodiments described herein relate generally to a magnetic recording/reproducing device and a control method of a magnetic recording/reproducing device.

BACKGROUND

In heat-assisted magnetic recording heads, the temperatures of magnetic disks are increased by laser to perform recording. It is found that, at this time, a component considered to derive from the magnetic film of each magnetic disk is attached to the distal end of a near-field transducer (NFT) via a lubricant by the increase in temperature and thus, a cured material is generated.

The generation of the lubricant cured material cannot be prevented on the principle of recording. It is also found that, when the lubricant cured material is firmly fixed, the transmittance of laser is increased, and the lubricant cured material functions as a layer which increases the transmission efficiency of laser.

When the flying height is decreased, the lubricant cured material is shaven by abrasion. When the flying height is increased, restructuring is performed by filling the portion located between the head and the medium with a lubricant. For this reason, for example, in a case where the heat-assisted magnetic recording head moves from a track with a low flotation to a track with a high flotation when the flying height changes within the disk surface, the recording performance is degraded until a cured material is generated.

BRIEF DESCRIPTION OF THE DRAWINGS

FIG. 10 is a flow diagram showing another example of the control method of the magnetic recording/reproducing device according to the second embodiment.

DETAILED DESCRIPTION

Figure 1:
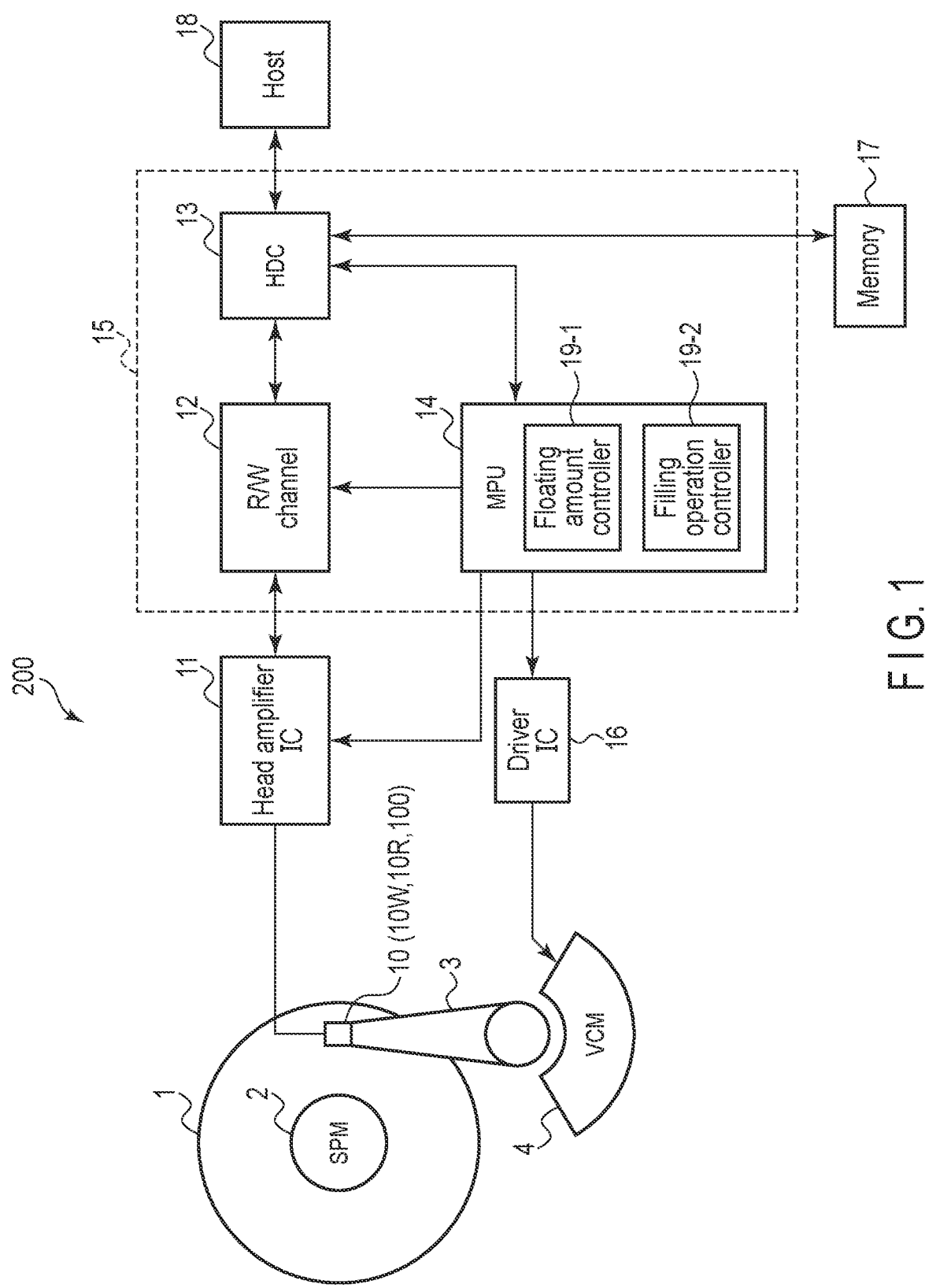
FIG. 1 is a block diagram showing the configuration of an example of a magnetic recording/reproducing device according to a first embodiment.

Various embodiments will be described hereinafter with reference to the accompanying drawings.

In general, according to an embodiment, a control method of a magnetic recording/reproducing device comprising a heat-assisted magnetic recording head and a heat-assisted magnetic recording medium comprising a recording surface on which a lubricant is provided includes, after performing recording by the heat-assisted magnetic recording head at a first height of a head flying height, changing the head flying height to a second height which is higher than the first height, and filling a portion located between the heat-assisted magnetic recording head and the recording surface with the lubricant by operating the heat-assisted magnetic recording head, and forming a lubricant filling area having the second height.

According to the other embodiment, a magnetic recording/reproducing device includes a heat-assisted magnetic recording head, a heat-assisted magnetic recording medium comprising a recording surface on which a lubricant is provided, a flying height controller which changes a head flying height to a second height which is higher than a first height after performing recording by the heat-assisted magnetic recording head at the first height of the head flying height, and a filling operation controller which fills a portion located between the heat-assisted magnetic recording head and the recording surface with the lubricant by operating the heat-assisted magnetic recording head on the recording surface, and forms a lubricant filling area having the second height.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

EXAMPLES

Embodiments are explained in detail below while showing examples.

First, this specification explains the configuration of a disk drive according to a first embodiment with reference to FIG. 1. It should be noted that the configuration of the disk drive shown in FIG. 1 as a magnetic recording/reproducing device is also applied to each of the embodiments described later.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

As shown in FIG. 1, a disk drive 200 is a magnetic recording/reproducing device which has a perpendicular magnetic recording system and into which a magnetic disk 1 which is a perpendicular magnetic recording medium and a magnetic head 10 comprising the magnetic flux control layer described later are incorporated.

Figure 2:
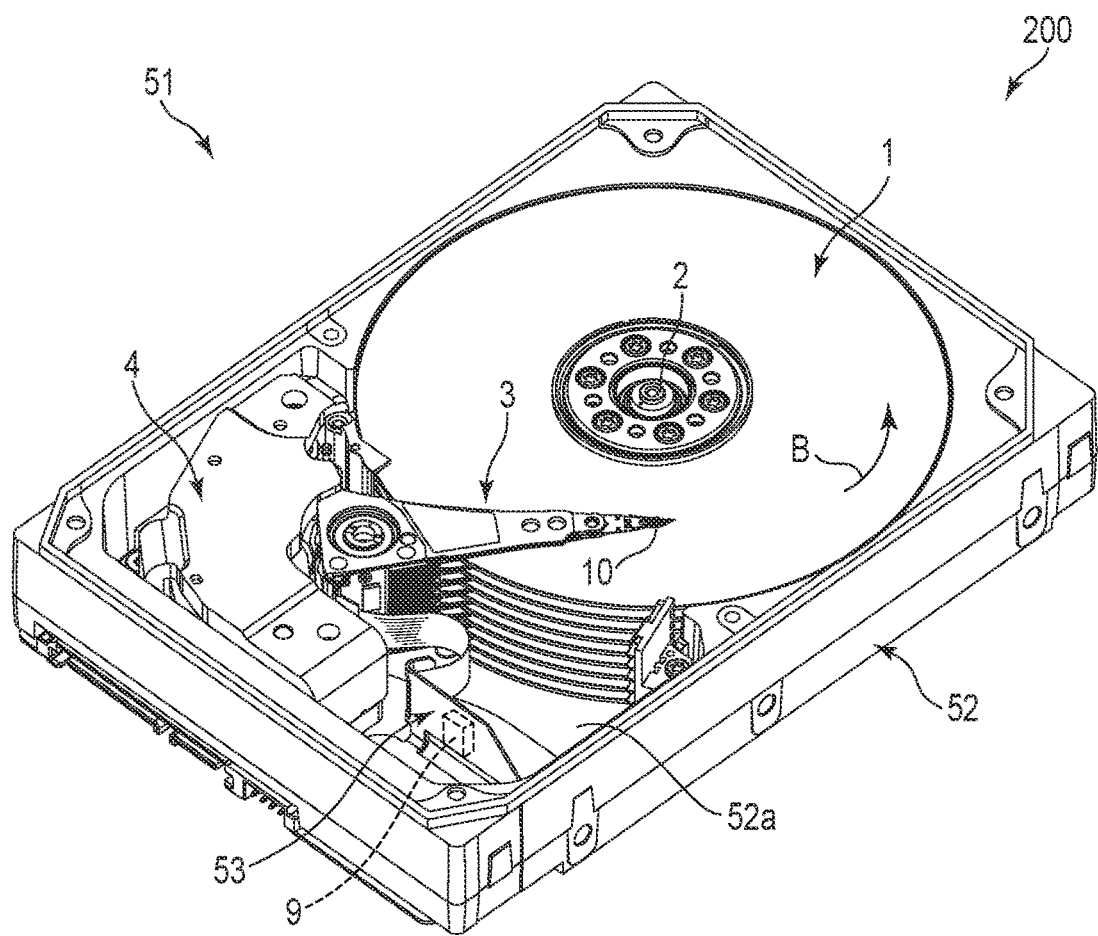
FIG. 2 is part of an exploded perspective view of the magnetic recording/reproducing device according to the first embodiment.

FIG. 2 is part of an exploded perspective view of the magnetic recording/reproducing device according to the first embodiment.

FIG. 2 shows the state in which a plurality of magnetic disks 1 and a plurality of magnetic heads 10 are accommodated in a housing 51 in the magnetic recording/reproducing device of the first embodiment. In FIG. 2, a cover unit is omitted.

The disks 1 are secured to a spindle motor (SPM) 2 and are rotatably attached. The magnetic heads 10 are mounted on an actuator 3 and are configured to move in radial directions on the disks 1. The actuator 3 is rotated by a voice coil motor (VCM) 4. The magnetic heads 10 comprise a write head 10W, a read head 10R and a heat assist unit 100. The write head 10W writes data to the magnetic disks 1. The read head 10R reads data from the magnetic disks 1. When the write head 10W writes data to the magnetic disks 1, the heat assist unit 100 assists the write head 10W in writing data. A single magnetic head or a plurality of magnetic heads may be applied as the magnetic heads 10.

The disk drive further comprises a head amplifier integrated circuit (head amplifier IC) 11, a read/write channel (R/W channel) 12, a hard disk controller (HDC) 13, a microprocessor (MPU) 14, a driver IC 16 and a memory 17. The R/W channel 12, the HDC 13 and the MPU 14 are incorporated into a controller 15 which consists of a single-chip integrated circuit.

As described later, the head amplifier IC 11 includes a group of circuits for driving a laser diode for performing heat assist. The head amplifier IC 11 further includes a driver which supplies a recording signal (write current) based on the write data provided by the R/W channel 12 to the recording head 10W. Moreover, the head amplifier IC 11 includes a read amplifier which amplifies a read signal output from the reproducing head 10R and transmits the read signal to the R/W channel 12.

The R/W channel 12 is the signal processing circuit of read/write data. The HDC 13 constitutes an interface between the disk drive and a host 18 and performs transfer control of read/write data.

The MPU 14 is the main controller of the disk drive and performs servo control which is necessary to control read/write operation and determine the positions of the magnetic heads 10. Moreover, the MPU 14 includes a flying height controller 19-1 which controls the head flying height such that the head flying height is changed to a second height which is higher than a first height after the write head 10W for heat-assisted magnetic recording performs recording at the first height of the head flying height. The MPU 14 further includes a filling operation controller 19-2 which controls the filling operation of a lubricant between the head 10W and a recording surface 1a by using the write head 10W for heat-assisted magnetic recording to form a lubricant filling area having the second height.

The memory 17 includes a buffer memory consisting of a DRAM, a flash memory and the like. The memory 17 may also include the system area of a magnetic recording medium.

Figure 3:
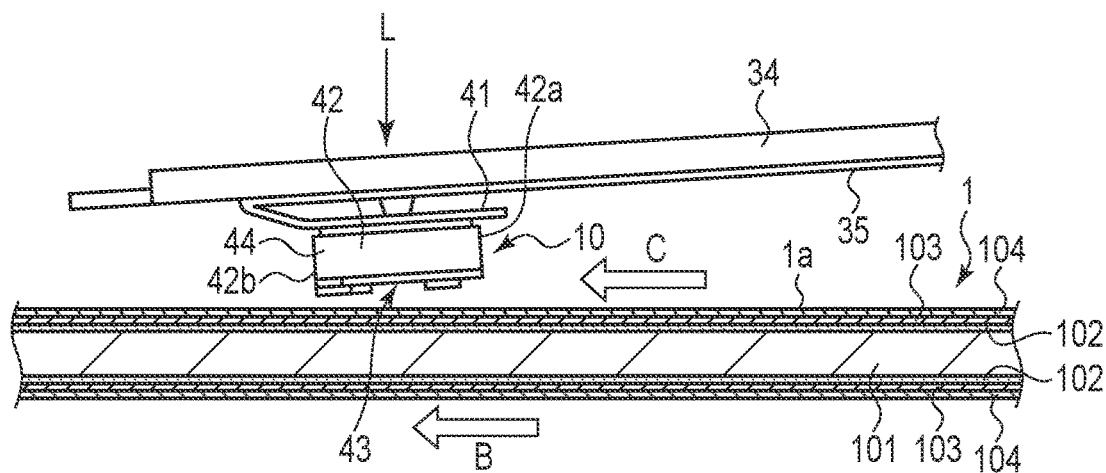
FIG. 3 is a side view showing a magnetic head 10 and a suspension.

FIG. 3 is a side view showing the magnetic head 10 and a suspension.

As shown in FIG. 3, each magnetic head 10 is formed as a floating type of head and comprises a slider 42 having the shape of substantially a rectangular parallelepiped and a head portion 44 which is provided at the outflow end (trailing end) of the slider 42 and which is used for recording/reproducing. The magnetic head 10 is secured to a gimbal spring 41 provided in the distal end portion of a suspension 34. A head load L which proceeds to the surface of the magnetic disk 1 is applied to each magnetic head 10 by the elasticity of the suspension 34. As shown in FIG. 2, each magnetic head 10 is connected to the head amplifier IC 11 and the HDC 13 via the suspension 34 and an interconnection member (flexure) 35 secured onto an arm.

Now, this specification explains the configurations of the magnetic disks 1 and the magnetic heads 10 in detail.

Figure 4:
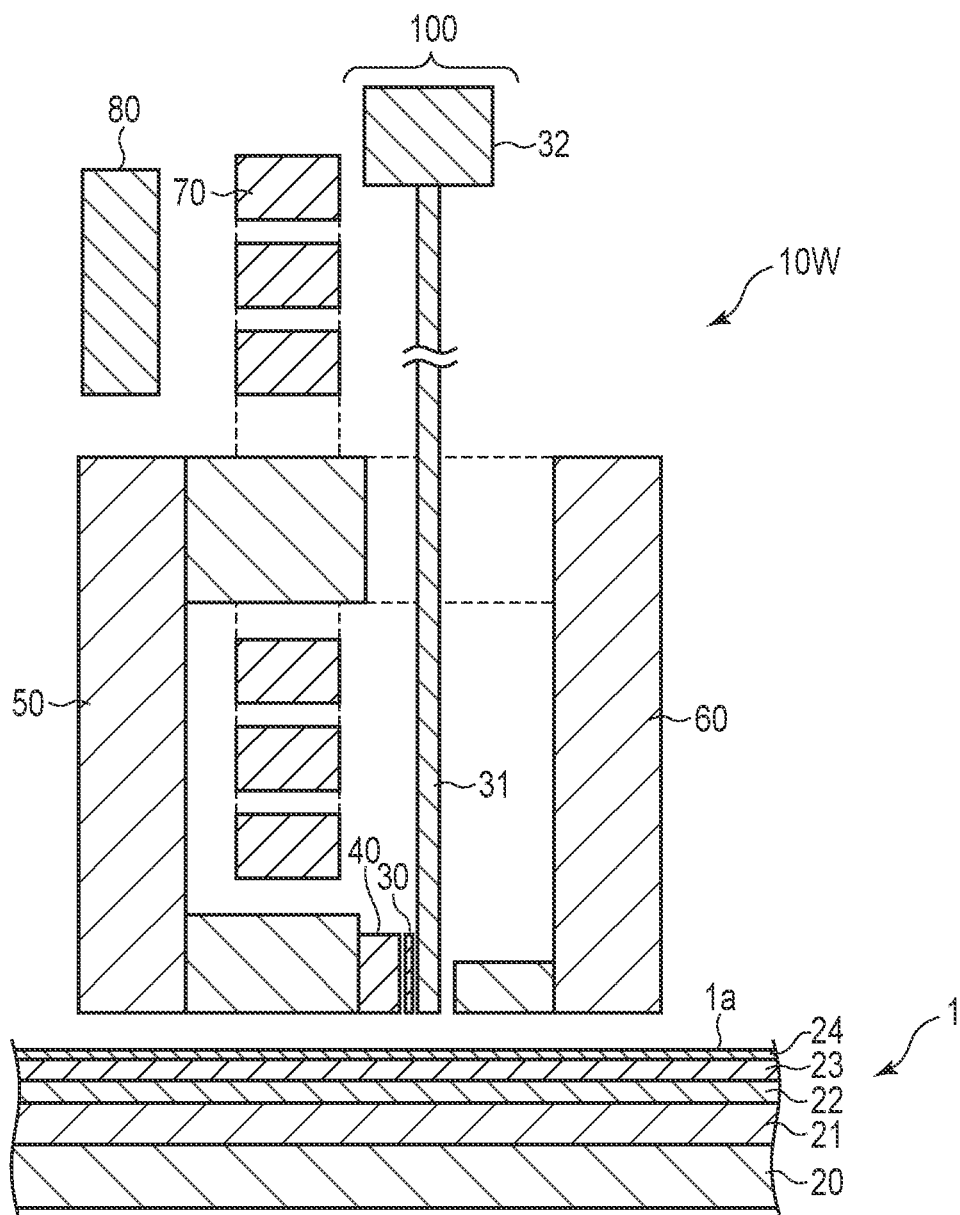
FIG. 4 is a transverse cross-sectional view of part of the magnetic recording/reproducing device according to the first embodiment.

FIG. 4 is a transverse cross-sectional view of the write head 10W and the magnetic disk 1 as part of the magnetic recording/reproducing device.

The magnetic disk 1 comprises a substrate 20, a heat sink layer 21, a crystal alignment layer 22 and a perpendicular recording layer 23 stacked in order on the substrate 20, and a protective film 24 comprising a surface to which a lubricant is applied. The perpendicular recording layer 23 has a large anisotropy in a perpendicular direction relative to the disk surface. The crystal alignment layer 22 is provided under the perpendicular recording layer 23 to improve the orientation of the perpendicular recording layer 23. The heat sink layer 21 is provided under the crystal alignment layer 22 to prevent the expansion of the heating area. The protective film 24 is provided on the upper side of the perpendicular recording layer 23 and protects the perpendicular recording layer 23.

The magnetic head 10 is structured as a separate type of magnetic head which is divided into the recording head 10W and the reproducing head 10R. The recording head 10W consists of a main magnetic pole 40 formed of a high magnetic permeability material which generates a perpendicular magnetic field relative to the disk surface, a trailing yoke 50 which supplies a magnetic flux to the main magnetic pole 40 and is magnetically joined to the main magnetic pole, a return shielding magnetic pole 60 provided to efficiently close the magnetic path immediately under the main magnetic pole on the leading side of the main magnetic pole 40, a coil 70 provided so as to wind around a magnetic path including the trailing yoke and the return shielding magnetic pole to supply a magnetic flux to the main magnetic pole 40, a heater 80 for controlling the flying height of the recording head, a near-field transducer 30 which generates near-field light which heats up the perpendicular recording layer 23 of the magnetic recording medium 1 on the leading side of the main magnetic pole 40, and a waveguide 31 for the propagation of light for the generation of near-field light. A light source is incorporated such that a laser diode 32 is mounted on the slider of the actuator assembly 3. For the near-field transducer 30, for example, Au, Pd, Pt, Ph or Ir or an alloy which consists of a combination of some of these materials may be used. For an insulating layer provided between the main magnetic pole and the near-field transducer, for example, an oxide formed of $SiO_2$, $Al_2O_3$, etc., may be used.

As the recording system of heat-assisted magnetic recording which can be used for the magnetic recording/reproducing device 200, conventional magnetic recording (CMR), shingled magnetic recording (SMR), interlaced magnetic recording (IMR) or a combination of these recording methods can be considered. The CMR is a normal recording system which writes data to a track at intervals in a radial direction and performs recording such that adjacent tracks do not overlap each other. In the SMR, tracks which overlap in order in a radial direction are provided, and data is recorded so as to overlap part of an adjacent track. In the IMR, bottom and top tracks provided such that adjacent tracks alternately overlap are provided, and data is recorded in a bottom track, and subsequently, data is recorded in an interlaced top track so as to overlap the bottom track.

The magnetic recording/reproducing device 200 can contain an oxygen gas in a range greater than or equal to 1 volume percent and less than or equal to 20 volume percent. When the contained amount of an oxygen gas is less than 1 volume percent, the probability of contact between the head and the medium tends to increase as a deposit attached to the head increases. When the contained amount exceeds 20 volume percent, there is a tendency that the accuracy of determining the position of the head cannot attain the desired level.

Figure 5:
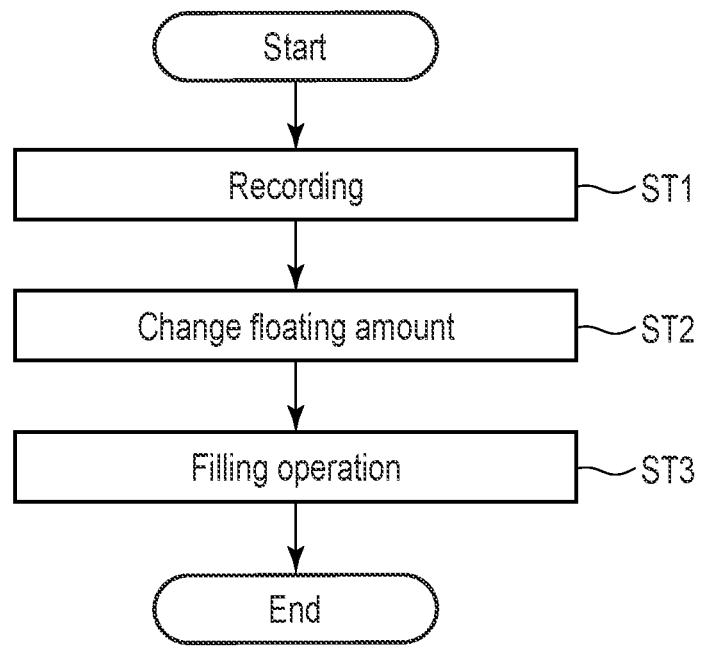
FIG. 5 is a flow diagram showing a control method of a magnetic recording/reproducing device according to a second embodiment.

FIG. 5 is a flow diagram showing a control method of a magnetic recording/reproducing device according to a second embodiment.

Figure 6:
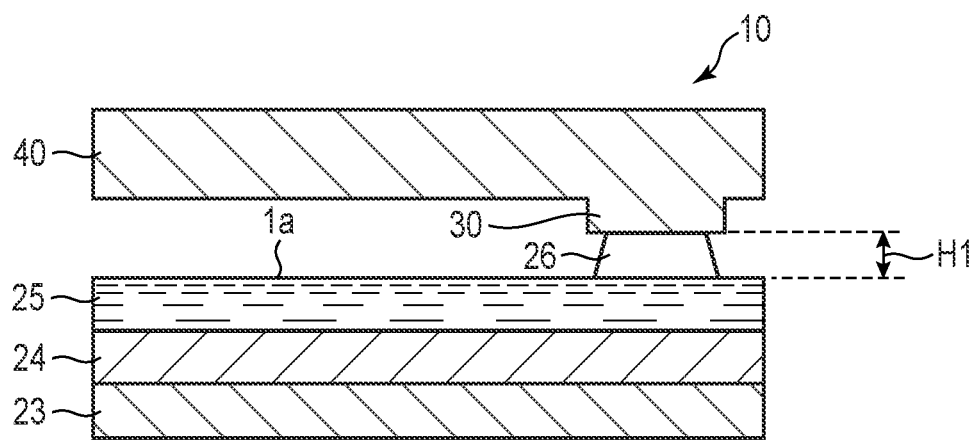
FIG. 6 is a model diagram showing the formation process of a lubricant filling area.
Figure 7:
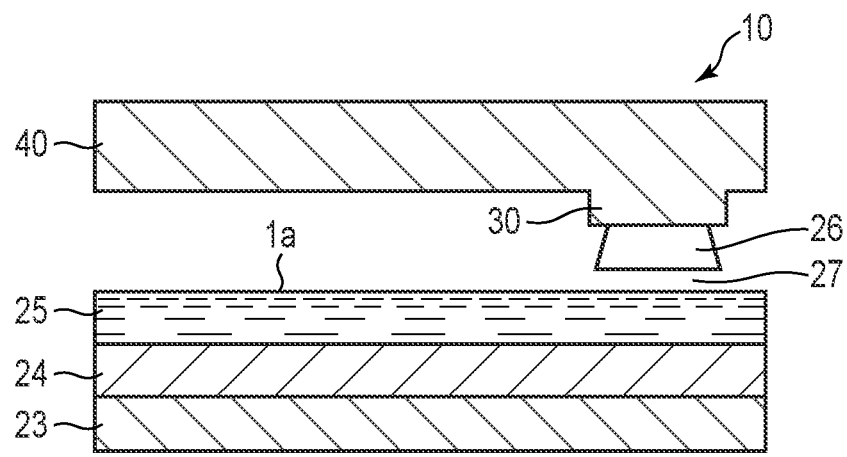
FIG. 7 is a model diagram showing the formation process of the lubricant filling area.
Figure 8:
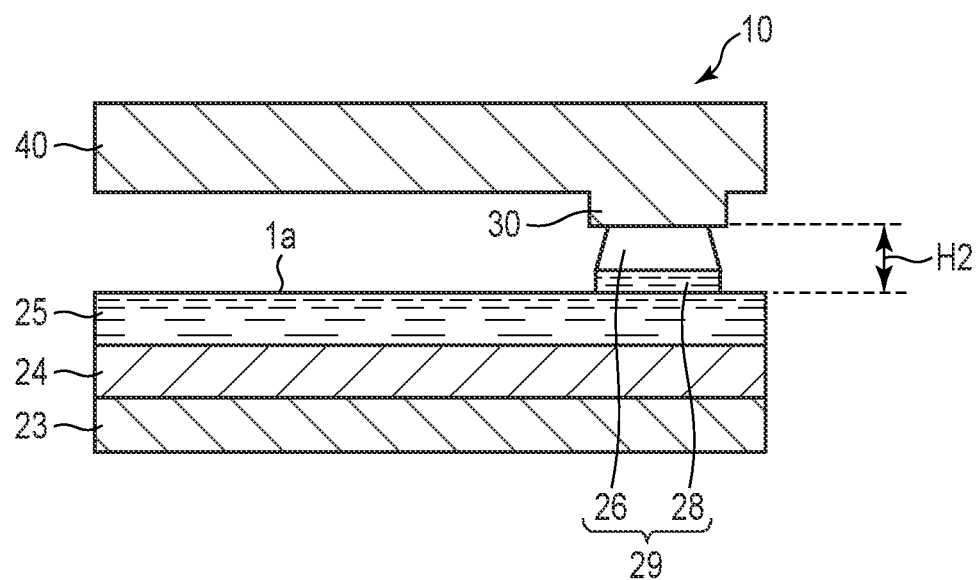
FIG. 8 is a model diagram showing the formation process of the lubricant filling area.

Each of FIG. 6, FIG. 7 and FIG. 8 is a model diagram showing the formation process of a lubricant filling area in the heat-assisted magnetic recording head.

As shown in FIG. 5 and FIG. 6, first, seeking is performed by using a heat-assisted magnetic recording head 10 comprising an NFT 30 and a main magnetic pole 40 at the distal end on a magnetic disk 1 comprising a magnetic recording layer 23, a protective layer 24 and a lubricant layer 25 applied onto the protective layer 24 with a first height H1 as the head flying height, and the magnetic recording operation by the heat-assisted recording head 10 is performed with the first height H1 of the head flying height (ST1). By this operation, the lubricant put from the lubricant layer 25 to the distal end of the NFT 30 is cured, and a lubricant cured material 26 having the first height H1 could be attached to the heat-assisted magnetic recording head 10.

Subsequently, for example, a track for exclusive use of dummy write is prepared as a track for operating the heat-assisted magnetic recording head at the time of the filling operation of the lubricant, and the track is accessed, and the head flying height is changed to a second height H2 which is higher than the first height H1 by a flying height controller 19-1 (ST2). In this manner, as shown in FIG. 7, a gap 27 can be defined between the lubricant cured material 26 at the distal end of the NFT 30 and the magnetic recording medium 1 by increasing the distance between the heat-assisted magnetic recording head 10 and the recording surface 1a of the magnetic recording medium 1 by increasing the flying height to the second height H2.

Subsequently, the filling operation of the lubricant between the lubricant cured material 26 and the recording surface 1a is performed by causing the heat-assisted magnetic recording head 10 to operate in accordance with a filling operation controller 19-2 (ST3). As the filling operation of the lubricant, first, seeking is performed using the heat-assisted magnetic recording head 10 on the track for dummy write. Thus, from the lubricant layer 25, the lubricant is put into the gap 27 by surface tension. Subsequently, when irradiation is performed with laser in this state, and magnetic recording is performed, the lubricant which fills the vicinity of the lubricant cured material 26 at the distal end of the NFT 30 is cured, and thus, a lubricant cured material 28 can be formed. By this process, as shown in FIG. 8, a lubricant filling area 29 including the lubricant cured material 26 and the lubricant cured material 28 and having the second height can be provided in the heat-assisted magnetic recording head 10.

The state of hardening of the cured lubricant materials 26 and 28 can depend on the process in which the lubricant material attached around the NFT hardens. Examples of such cured lubricant materials can include a lubricant material has been dehydrated and condensed, a lubricant material has changed its bonding state to become a polymer, and a lubricant material having an increased hardness. The hardness of the lubricant material may increase as oxides such as $SiO_X$ (x is 0.1 to 2), $TaO_X$ (x is 0.1 to 2.5), and $TiO_X$ (x is 0.1 to 2) derived from the magnetic recording layer 23 accumulate in the lubricant material.

In this manner, in the embodiment, a lubricant filling area can be provided in the head in advance by increasing the head flying height after the completion of magnetic recording operation. Thus, even if the head flying height differs depending on the track, magnetic recording can be performed without degrading the recording performance by shortening the time required to fill the gap with the lubricant in connection with the change in the flying height, in other words, the time in which the recording performance is degraded, to a maximum extent.

A similar effect can be obtained by drawing the same pattern by increasing the flying height to the second height on the same track as the track on which heat-assisted magnetic recording is performed lastly without preparing a track for dummy write as the track to be used to causing the heat-assisted magnetic recording head to operate at the time of the filling operation of the lubricant.

In the filling operation of a lubricant by the heat-assisted magnetic recording head, for example, magnetic recording is performed while performing laser irradiation by heat-assisted magnetic recording operation after the seeking operation of the heat-assisted magnetic recording head, or only the seeking operation of the heat-assisted magnetic recording head is performed without performing laser irradiation by heat-assisted magnetic recording operation.

The lubricant filling area 29 could be the lubricant cured material shown in FIG. 8 when magnetic recording is performed while performing laser irradiation. When only the seeking operation of the heat-assisted magnetic recording head is performed, the lubricant filling area 29 can contain a lubricant cured material and an uncured lubricant or a lubricant which is not sufficiently cured. Even if laser irradiation is not performed, the lubricant can be attached to the distal end of the NFT by merely changing the flying height and performing seeking. In this case, curing does not occur as the increase in temperature by near-field light is not caused. However, in a case where the flying height changes at the time of performing next magnetic recording, the time required to fill the gap with a lubricant can be shortened, and thus, the time in which the recording performance is degraded can be shortened.

The time points at which the filling operation of a lubricant should be performed can be set as follows. For example, filling operation is performed once a certain period of time. When a defect such as a projection is present on the medium, filling operation is performed after the pass through a registered position. Alternatively, an idle state continues for more than a certain period time. The flying height can be changed by the following method.

First, to respond to an unexpected change in flotation, a uniform increase by a constant value can be considered. A flying height table for each area, a defect map in which the positions of defects such as projections on the magnetic recording medium are registered, a flying height adjustment table for determining the adjustment value for each area and the like can be stored in the system area of the magnetic recording medium in advance. For example, in the flying height table of each area, the adjustment value can be determined by calculating the difference in the flying height between the area in which writing is currently performed and the area for next writing.

Figure 9:
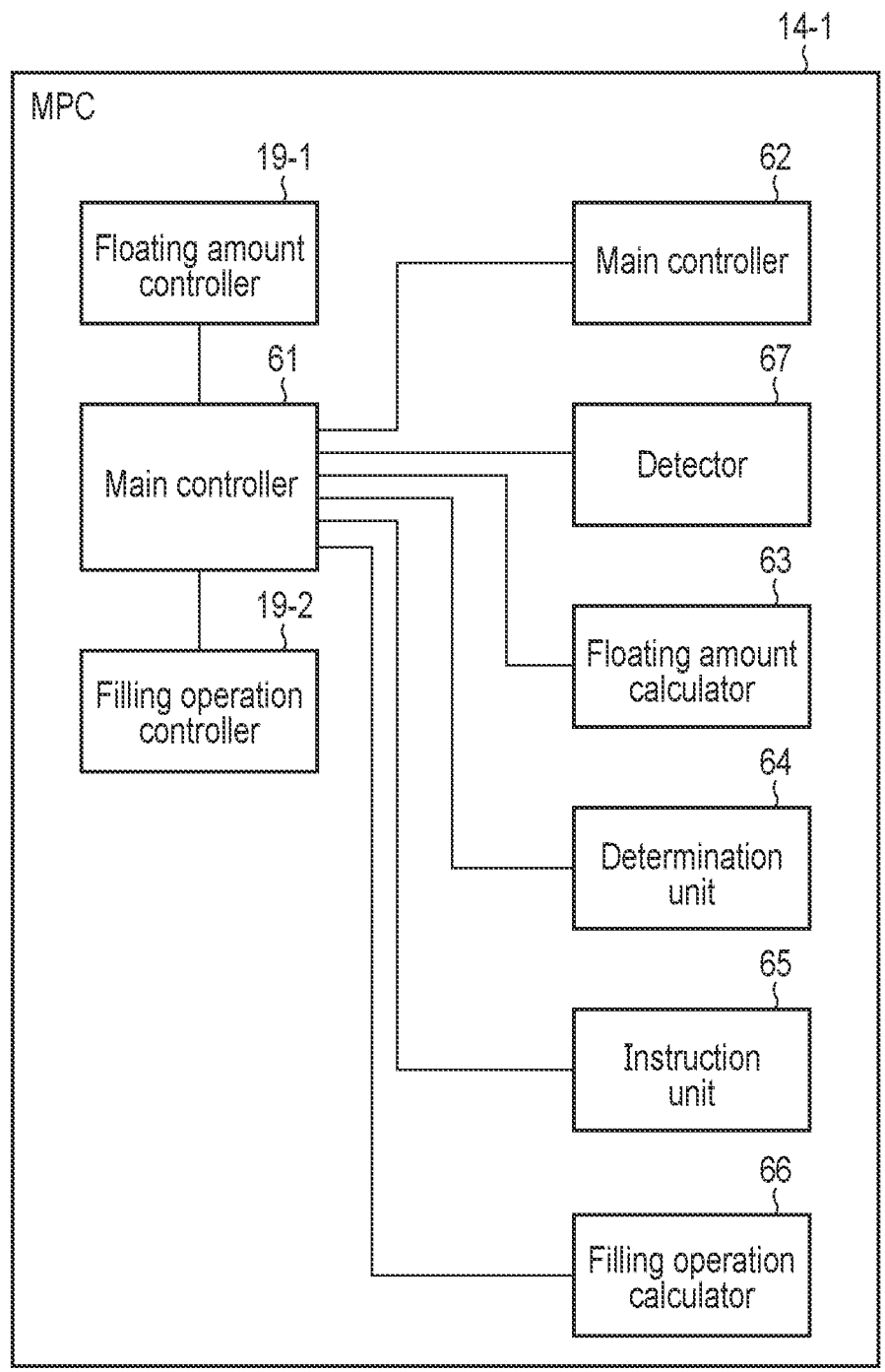
FIG. 9 is a block diagram showing another example of an MPU which can be used for the magnetic recording/reproducing device according to the first embodiment.

FIG. 9 is a block diagram showing another example of an MPU which can be used for the magnetic recording/reproducing device according to the first embodiment.

FIG. 9 can be applied to the magnetic recording/reproducing device of FIG. 1 and comprises the same configuration as FIG. 1 other than the use of an MPU 14-1 in place of the MPU 14.

As shown in the figure, the MPU 14-1 comprises a detector 67 which detects a set value for determining the filling operation of a lubricant, a filling operation calculator 66 which calculates the filling operation of a lubricant in response to the detection result, a filling operation controller 19-2 which causes the write head 10W for heat-assisted magnetic recording to operate in response to the result of the filling operation calculator 66, controls the filling operation of a lubricant between the head 10W and the recording surface 1a by, for example, performing only seeking or performing recording by laser irradiation at a predetermined time point and forms a lubricant filling area having the second height, a timing determination unit 19-3 which determines the time points at which the filling operation of a lubricant should be performed, a flying height calculator 63 which performs recording by the write head 10W for heat-assisted magnetic recording at the first height as the head flying height and subsequently calculates the flying height in the zone for next recording by the write head 10W, a determination unit 64 which determines the head flying height in response to the calculation result, an instruction unit 65 which issues instructions to change the head flying height in response to the determination result from the determination unit 64, a flying height controller 19-1 which controls the head flying height in response to the instructions from the instruction unit 65 and changes the height to the second height which is higher than the first height, and a main controller 61 which is connected to the flying height controller 19-1, the filling operation controller 19-2, the timing determination unit 19-3, the flying height calculator 63, the determination unit 64, the instruction unit 65, the filling operation calculator 66 and the detector 67 and controls the whole device.

FIG. 10 is a flow diagram showing another example of the control method of the magnetic recording/reproducing device according to the second embodiment.

As shown in the figure, in another example of the control method of the magnetic recording/reproducing device of the embodiment, first, a set value for determining the filling operation of a lubricant is detected by the detector 67. By the filling operation calculator 66, the filling operation of a lubricant is calculated so as to correspond to the set value. In response to the calculation result, the filling operation controller 19-2 sets the filling operation of a lubricant between the head 10W and the recording surface 1a (ST11). The set value can include a parameter for determining filling operation, the filling time, etc., and can be set in advance and can be registered in the system area of the magnetic recording medium. For example, when the set value of filling operation is 0, seeking is performed on a track for dummy write using the write head 10W for heat-assisted magnetic recording, and laser irradiation is performed for recording. When the set value of filling operation is 1, seeking is performed on a track for dummy write using the write head 10W for heat-assisted magnetic recording, and recording by laser irradiation is not performed. The filling time can be determined so as to correspond to the set value of the filling time. Here, a case where recording is performed while performing laser irradiation is explained.

Subsequently, the timing determination unit 19-3 determines whether or not filling operation should be performed, and sets the time points at which filling operation should be performed based on the obtained result (ST12).

Subsequently, the write head 10W for heat-assisted magnetic recording performs recording (ST13).

Subsequently, whether or not the flying height should be changed is determined (ST14). When the flying height is not changed, the process returns to step ST13 to perform next recording. As the case where the flying height is not changed, for example, the greatest flying height in the zone for performing next recording is less than or equal to the first height.

When the flying height is changed, for example, the main controller obtains, as the memory 17, the greatest flying height in the zone for performing next recording from the flying height table registered in the system area of the magnetic recording medium for each area. The flying height calculator 63 calculates the flying height of the second height from the greatest flying height (ST15).

In response to the calculation result, the determination unit 64 determines the head flying height (ST16). In response to the determination result from the determination unit 64, the flying height controller 19-1 controls the head flying height to change it to the second height which is higher than the first height (ST17). In response to the result of the filling operation calculator 66, the filling operation controller 19-2 performs the filling operation of a lubricant between the head 10W for heat-assisted magnetic recording and the recording surface 1a by performing recording with laser irradiation by controlling the operation of the write head 10W (ST18), and forms a lubricant filling area having the second height.

Whether or not next recording should be performed is determined (ST19). When recording is performed, the process returns to step ST13 to perform next recording.

When recording is not performed, the process is terminated.

Example 1

Twenty heat-assisted magnetic recording/reproducing devices comprising the same configuration as FIG. 1 are prepared.

Ten of the above devices are applied as example 1 including the process of forming a lubricant filling area of the cured portion. Regarding the other ten devices, the process of forming a special lubricant filling area is not performed as comparative example 1. To form a lubricant filling area, the move to a zone for forming the lubricant filling area is performed, and a random pattern is written 1000 times in a state where a laser is turned on. The flying height of the devices are set so as to be constant in all zones. Writing is performed by increasing the flying height by 0.2 nm to form a lubricant filling area. The formation of a lubricant filling area is set so as to be automatically performed at regular time intervals (here, once 5 minutes) or when the zone is changed.

Subsequently, regarding a case where the zone is considerably changed (specifically, when the move is greater than or equal to 5 mm at radial positions) at the time of writing, the bit error rate (BER) for each time is measured.

Figure 11:
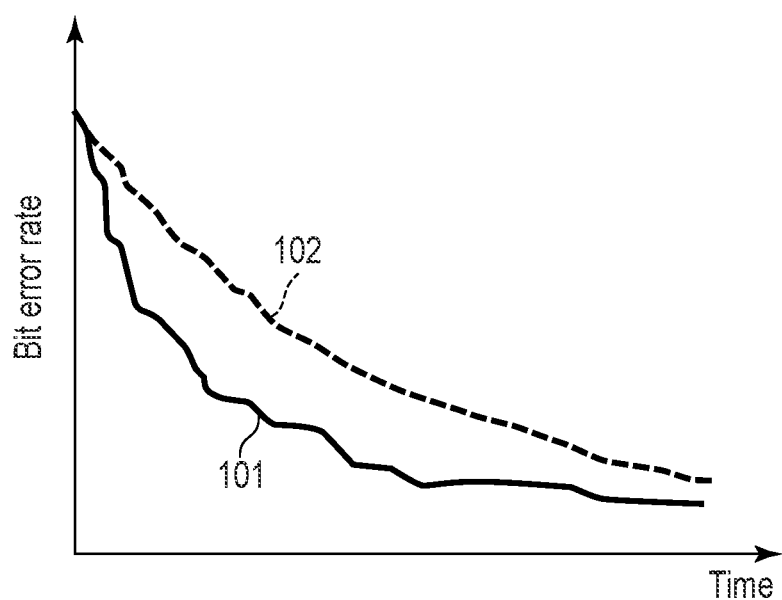
FIG. 11 is a graph chart showing the change in the BER relative to time in example 1.

FIG. 11 is a graph chart showing results obtained by measuring the bit error rate for each time regarding one of the devices of example 1 and one of the devices of comparative example 1.

As shown in the figure, in both example 1 (curve 101) and comparative example 1 (curve 102), the BER is improved and approaches a constant value over time.

It is considered that this result is obtained as the area between the head and the medium is filled with the lubricant and curing proceeds by repeating writing. In this regard, in example 1 including the process of forming the lubricant filling area this time, the time which is required until the BER reaches a constant value is shortened, and is approximately ⅕ of comparative example 1. It is considered that this result is obtained as the time which is required until the BER reaches a constant value can be made short because of the presence of a lubricant which starts to cure. These results show that the process of forming the lubricant filling area in the embodiment can prevent the change in the BER and shorten the time required to attain convergence.

Example 2

Twenty heat-assisted magnetic recording/reproducing devices comprising the same configuration as FIG. 1 are prepared. Ten of the devices are applied as example 2 including the process of forming a lubricant filling area of the cured portion. Regarding the other ten devices, the process of forming a special lubricant filling area is not performed as comparative example 2. To form a lubricant filling area, the move to a zone for forming the lubricant filling area is performed, and a random pattern is written 7200 times in a state where a laser is turned on. The flying height of the devices are set so as to be constant in all zones. Writing is performed by increasing the flying height by 0.3 nm to form a lubricant filling area. The formation of a lubricant filling area is set so as to be automatically performed when the state becomes an idle state.

After the pass through a defect, the process of forming a lubricant filling area is performed. Subsequently, the BER for each time is measured. In both example 2 and comparative example 2, the BER is improved and approaches a constant value over time. In this regard, in example 2 including the process of forming the lubricant filling area this time, the time which is required until the BER reaches a constant value is shortened, and is approximately ⅛ of comparative example 2. These results show that the process of forming the lubricant filling area in the embodiment can prevent the change in the BER and shorten the time required to attain convergence.

Example 3

Twenty heat-assisted magnetic recording/reproducing devices comprising the same configuration as FIG. 1 are prepared. Ten of the devices are applied as example 3 including the process of forming a lubricant filling area. Regarding the other ten devices, the process of forming a special lubricant filling area is not performed as comparative example 3. To form a lubricant filling area, seeking is performed on the track on which writing is performed lastly in a state where a laser is turned off. In the devices, the flying height slightly differs depending on the zone. Seeking is performed by increasing the flying height by 0.3 nm in the zone for next writing. The formation of a lubricant filling area is set so as to be certainly performed when the zone is changed and the head passes through the portion on a registered defect.

After the pass through a defect, the process of forming a lubricant filling area is performed. Subsequently, the BER for each time is measured. In both example 3 and comparative example 3, the BER is improved and approaches a constant value over time. In this regard, in example 3 including the process of forming the lubricant filling area this time, the time which is required until the BER reaches a constant value is shortened, and is approximately ½ of comparative example 3. These results show that the process of forming the lubricant filling area in the embodiment can prevent the change in the BER and shorten the time required to attain convergence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control method of a magnetic recording/reproducing device comprising a heat-assisted magnetic recording head, and a heat-assisted magnetic recording medium comprising a recording surface on which a lubricant is provided, the method including
    recording by the heat-assisted magnetic recording head at a first height of a head flying height,
    changing the head flying height to a second height which is higher than the first height, and
    filling a portion located between the heat-assisted magnetic recording head and the recording surface with the lubricant by operating the heat-assisted magnetic recording head, and forming a lubricant filling area having the second height.

2. The method of claim 1, wherein
    the first height is greater than or equal to a greatest flying height in a zone for recording.

3. The method of claim 1, wherein
    the second height is greater than or equal to a greatest flying height in a zone for recording after changing the head flying height.

4. The method of claim 1, wherein
    the lubricant is applied to the heat-assisted magnetic recording head surface by changing the head flying height to the second height which is higher than the first height.

5. The method of claim 1, wherein
    the operating the heat-assisted magnetic recording head is seeking the heat-assisted magnetic recording head on the recording surface.

6. The method of claim 1, wherein
the operating the heat-assisted magnetic recording head is to perform heat-assisted magnetic recording operation on the recording surface.

7. The method of claim 1, wherein
a track on which the heat-assisted magnetic recording head is operated is same as a track on which heat-assisted magnetic recording is performed lastly.

8. The method of claim 1, wherein
a track on which the heat-assisted magnetic recording head is operated is a track prepared for exclusive use.

9. The method of claim 1, wherein
the magnetic recording/reproducing device contains an oxygen gas in a range greater than or equal to 1 volume percent and less than or equal to 20 volume percent.

10. A magnetic recording/reproducing device comprising:
a heat-assisted magnetic recording head;
a heat-assisted magnetic recording medium including a recording surface on which a lubricant is provided;
a flying height controller which changes a head flying height to a second height which is higher than a first height after recording by the heat-assisted magnetic recording head at the first height of the head flying height; and
a filling operation controller which fills a portion located between the heat-assisted magnetic recording head and the recording surface with the lubricant by operating the heat-assisted magnetic recording head on the recording surface, and forms a lubricant filling area having the second height.

11. The magnetic recording/reproducing device of claim 10, wherein
the first height is greater than or equal to a greatest flying height in a zone configured to record.

12. The magnetic recording/reproducing device of claim 10, wherein
the second height is greater than or equal to a greatest flying height in a zone configured to record after changing the head flying height.

13. The magnetic recording/reproducing device of claim 10, wherein
the lubricant is applied to the heat-assisted magnetic recording head surface by changing the head flying height to the second height which is higher than the first height.

14. The magnetic recording/reproducing device of claim 10, wherein
the operating the heat-assisted magnetic recording head is seeking on the recording surface.

15. The magnetic recording/reproducing device of claim 10, wherein
the operating the heat-assisted magnetic recording head is to perform heat-assisted magnetic recording operation on the recording surface.

16. The magnetic recording/reproducing device of claim 10, wherein
a track on which the heat-assisted magnetic recording head is operated is same as a track on which heat-assisted magnetic recording is performed lastly.

17. The magnetic recording/reproducing device of claim 10, wherein
a track on which the heat-assisted magnetic recording head is operated is a track prepared for exclusive use.

18. The magnetic recording/reproducing device of claim 10, wherein
an oxygen gas is contained in a range greater than or equal to 1 volume percent and less than or equal to 20 volume percent.

* * * * *